US011238505B2

(12) United States Patent
Ekambaram et al.

(10) Patent No.: US 11,238,505 B2
(45) Date of Patent: Feb. 1, 2022

(54) MODEL TRADING IN A DEVICE

(71) Applicant: International Business Machines Corporation, Armonk, NY (US)

(72) Inventors: Vijay Ekambaram, Bangalore (IN); Syed Ali Hashim Moosavi, Bangalore (IN); Swati Rallapalli, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 551 days.

(21) Appl. No.: 15/446,795

(22) Filed: Mar. 1, 2017

(65) Prior Publication Data

US 2018/0253766 A1  Sep. 6, 2018

(51) Int. Cl.
*G06Q 30/02* (2012.01)
*G06N 20/00* (2019.01)

(52) U.S. Cl.
CPC ........ *G06Q 30/0283* (2013.01); *G06N 20/00* (2019.01)

(58) Field of Classification Search
CPC .. G06Q 30/0283; G06N 20/00; G06F 21/629; G06F 9/546; H04W 12/08; H04L 29/06; H04L 29/08072
USPC ...................................................... 705/400
See application file for complete search history.

(56) References Cited

U.S. PATENT DOCUMENTS

| 9,152,477 B1 | 10/2015 | Campbell et al. | |
|---|---|---|---|
| 9,537,835 B2 | 1/2017 | Kim et al. | |
| 2014/0018048 A1* | 1/2014 | Anand | H04W 4/60 455/414.1 |
| 2014/0337114 A1* | 11/2014 | Sachson | G06Q 40/12 705/14.25 |
| 2015/0100434 A1* | 4/2015 | Sanghavi | G06Q 30/0273 705/14.69 |

OTHER PUBLICATIONS

Pike, Jayca; "20+ Fitness Tools that Track Your Exercise, Meals, Sleep, and More" (2015); https://zapier.com/blog/best-fitness-tracking-apps/ (Year: 2015).*
RescueTime; https://www.rescuetime.com/security; (2013) (Year: 2013).*
Gokey, Malarie; "From food to sleep to weight, Nudge tracks every fitness metric inside one app"; May 29, 2014 (Year: 2014).*
RescueTime; RescueTime Security (Year: 2013).*
Pike, Jayca; "20+ Fitness Tools that Track Your Exercise, Meals, Sleep, and More"; Dec. 24, 2015. (Year: 2015).*
(Continued)

*Primary Examiner* — Resha Desai
*Assistant Examiner* — Dione N. Simpson
(74) *Attorney, Agent, or Firm* — Peter Edwards, Esq.; McGinn I.P. Law Group, PLLC.

(57) ABSTRACT

A model trading method, system, and computer program product include extracting a feature-model list from a first application and a feature-model list from a second application on a device, creating a price model for a price for each feature-model of the feature-model list of the second application that matches a feature-model of the feature-model list for the first application, and facilitating feature-model trading between the first application and the second application based on the feature-model list and the price model.

14 Claims, 5 Drawing Sheets

(56) References Cited

OTHER PUBLICATIONS

RescueTime Security; Apr. 5, 2013 (Year: 2013).*
Allan, Missy; "A Beginner's Walk Through HealthKit"; Oct. 5, 2016. (Year: 2016).*
LEO Learning; "Apple Developer vs Apple Enterprise licenses—what does it mean to you?"; Nov. 20, 2012. (Year: 2012).*
Gokey, Malarie; "From Food to Sleep to Weight, Nudge Tracks Every Fitness Metric Inside One App"; May 28, 2014. (Year: 2014).*
Mel, et al. "The NIST Definition of Cloud Computing". Recommendations of the National Institute of Standards and Technology. Nov. 16, 2015.

\* cited by examiner

MODEL TRADING IN A DEVICE

BACKGROUND

The present invention relates generally to a model trading method applicable to a cloud computing environment, and more particularly, but not by way of limitation, to a system, method, and computer program product for an Operating System (OS) driven technique that matches feature-models between applications on a device by accumulating feature-model lists from each application, pricing each feature-model based on user feedback, and facilitating the feature-model trading between applications by comparing feature-models.

Conventionally, users operate a number of applications for different purposes. For example, a first user can use a suite of applications for tracking their fitness, with one application specifically for tracking sleep and another application for step-counting. Instead of using these applications independently, it would be very helpful if the step-counting application could use the sleep-tracking feature to provide the first user with better fitness analytics. Similarly, it would be of benefit to the first user if the food-delivery application could get the calorie-counting feature from the other fitness applications that the first user uses to provide them with better food recommendations.

Instead of waiting for each individual application to get the desired features as in the conventional techniques, there is a need in the art for the applications to communicate with each other and trade each other's features automatically so they could provide users with an improved experience.

SUMMARY

In an exemplary embodiment, the present invention can provide a computer-implemented model trading method, the method including extracting a feature-model list from a first application and a second application on a device, creating a price model for a price for each feature-model of the feature-model list of the second application that matches a feature-model of the feature-model list for the first application, and facilitating feature-model trading between the first application and the second application based on the feature-model list and the price model. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-6, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
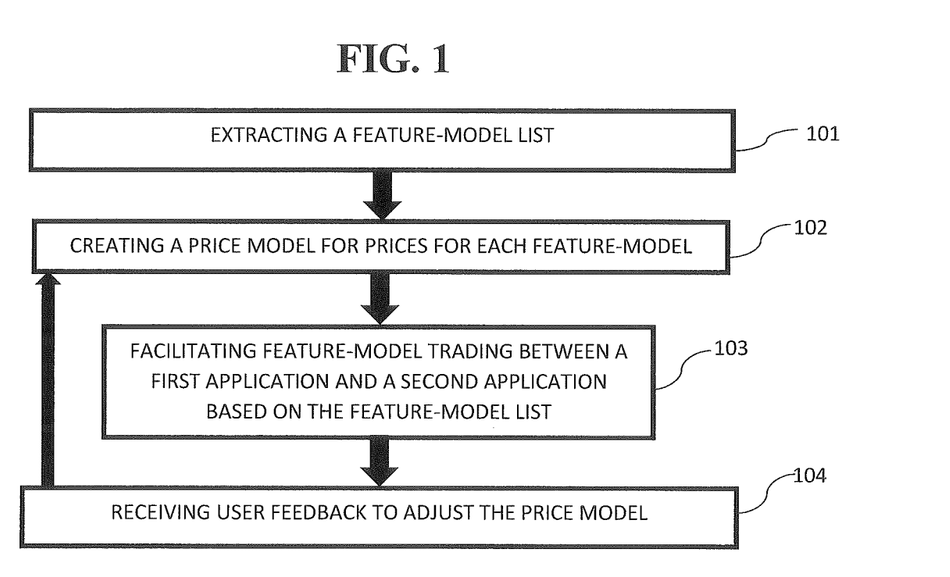
FIG. 1 exemplarily shows a high-level flow chart for a model trading method 100 according to an embodiment of the present invention.

By way of introduction of the example depicted in FIG. 1, an embodiment of a model trading method 100 according to the present invention can include various steps for matching feature-models between applications by accumulating feature-model lists from each application, pricing each feature-model based on user feedback, and facilitating the feature-model trading between applications by comparing feature-models.

Figure 4:
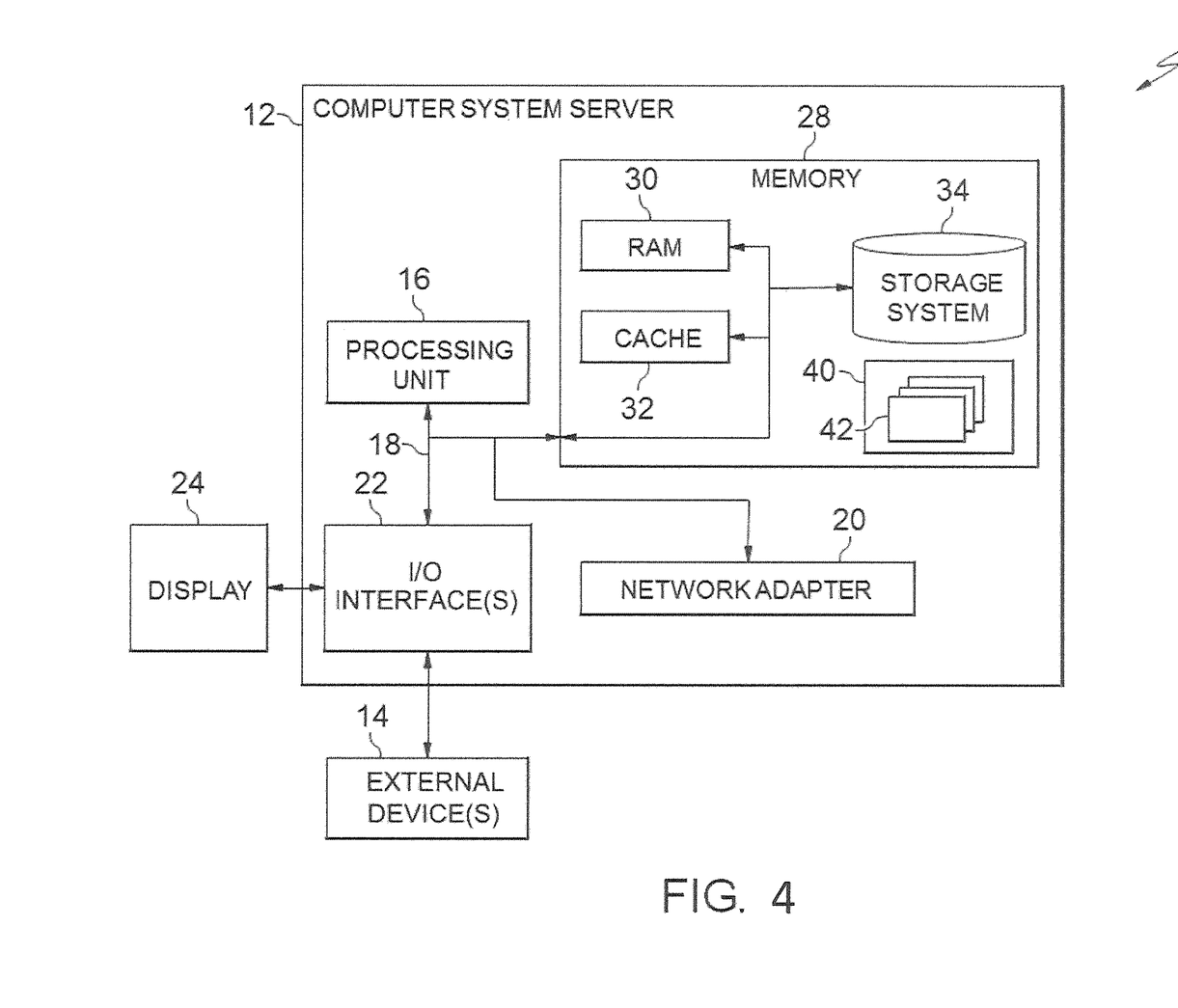
FIG. 4 depicts a cloud-computing node 10 according to an embodiment of the present invention.

By way of introduction of the example depicted in FIG. 4, one or more computers of a computer system 12 according to an embodiment of the present invention can include a memory 28 having instructions stored in a storage system to perform the steps of FIG. 1.

With reference now to FIG. 1, in step 101, a feature-model list is extracted from a first application. It is noted that a feature-model list includes any machine learning models, inferences, features developed, trained by an application. For example, meta data associated with the application can be included as part of the feature-model list such as geographical locations, electronic receipts, social media history, etc. That is, when a new application (i.e., a second application) is installed, updated, or utilized by the user to obtain new meta-data on a device, a query is received from the new (second) application for sharing their feature-model list. This can be automatic or based on a user confirmation (i.e., user approval). For example, a user can update an application with additional information such as a new order from a food ordering application. This new order triggers the feature-model list to be updated for the new meta-data of the application. When the new application shares their list of feature-models with previous applications, the new application stores it in their database and starts matching these models with the existing ones in the database through keyword spotting & context-based text analytics.

That is, every application in the device registers with, for example, a Feature-Model Trading Platform (FMTP) and shares their feature models' meta-data details being learnt from the end-user data.

In step 102, a price model is created for prices for each feature-model list. That is, each feature-model of the feature-model list is priced to then match with feature-models of other applications. The pricing is performed, for example, by performing analytics on usage statistics (i.e., implicit)

and by collecting user-surveys generated by the system (i.e., explicit). Thus, the FMTP can dynamically price the feature models (e.g., preferably individually, but in some embodiments the feature models could be priced as a group or bundle) of the feature model list based on the value the Feature-Model adds to the end-user. This is dynamically derived based on end-user implicit and explicit feedback (i.e., in step 104) to various prediction outputs suggested by the applications. The feedback could also be derived through existing user behavior analytics on applications. That is, in step 104, the user provides feedback based on the application use and the price model can be adjusted for the feature model.

The price of the feature-models traded are computed based on their utility to the applications, measured using explicit user feedback or implicit studies of number of clicks and conversions after incorporating the said feature model. The price can also incorporate other factors such as budget constraints of the buying applications etc. The price model can also include competition, for e.g., it is easy to obtain age data from several sources, however maybe harder to obtain a feature like the "favorite singer" of the user.

It is noted that the feature-model of the first application matches the feature-model of the second application based on a match of the underlying meta-data for enabling a common function of the first application and second application (i.e., geolocation history data of a driving application can assist a second application for finding a nearest store location (e.g., common function of location data)).

In step 103, feature-model trading between the first application and the second application on the user device is facilitated based on the feature-model list. However, any trading of user data between companies can be required to have user approval (i.e., a user typically must authorize any communication between third-party applications on a device). The method overcomes this by facilitating the trade while keeping all the information (i.e., private user data and application feature data to be shared) transparent with the user. That is, the user is aware of the feature-models being traded, what the price of these feature-model is, and how the trade will benefit them. If the user agrees to the conditions of the trade, then, in step 103, the method informs both the companies of the consent to then initiate the transfer process.

In step 104, pricing can be derived based on an implicit/explicit user satisfaction level with recommendations that use certain meta-data (i.e., user feedback). For example, if a user always visits the restaurant recommended by an application, then the feature can be priced higher than a second feature that is not used. This would be an example of an implicit user satisfaction level whereas a survey taken by the user about his ranking of the restaurants favorable would be an example of an explicit user satisfaction level. By way of further example, suppose that incorporating "calories consumed per day" into Yelp® restaurant recommendations helps make 10% more reservations, and "age of user" feature gets 15% more reservations, then while trading this feature with Open Table, "age of user" will have higher price than "calories consumed per day", if both features are equally hard to obtain. However, suppose that "calories consumed per day" is a rarer feature, then it's price may go up.

Therefore, when a user downloads, installs, updates a new application (i.e., a second application), the feature-model trading platform communicates with that new application to get the new applications' list of features-models corresponding to feature-models in the feature-model list which the application requires. After the list is obtained, the feature-models of the "new" application (i.e., the second (in time) application) are matched with the existing exposed feature models of old applications (i.e., a first application) already installed on the device. If there is a suitable match, then the platform informs the new application of the price of the matched feature(s) from the existing application that the platform set using the user-feedback and usage statistics of the existing app. If the user gives permission for feature trading (i.e., in step 103), then both the new application owner and the existing application owner are informed to take over the transaction process for feature trading for that particular user.

Thus, the method 100 can provide a Feature-Model Trading Platform (FMTP) across applications in a user device which helps in bootstrapping the Machine Learning (ML) feature models of new applications installed on the user device with rich feature-models derived from other old (i.e., previously) installed applications and in the user device. The FMTP can dynamically price and expose the feature-models of various installed applications in the device based on user-derived-appreciation/feedback and trades/auctions feature model(s) in the feature model list with new applications recently installed subject to end-user policy agreements.

Figure 3:
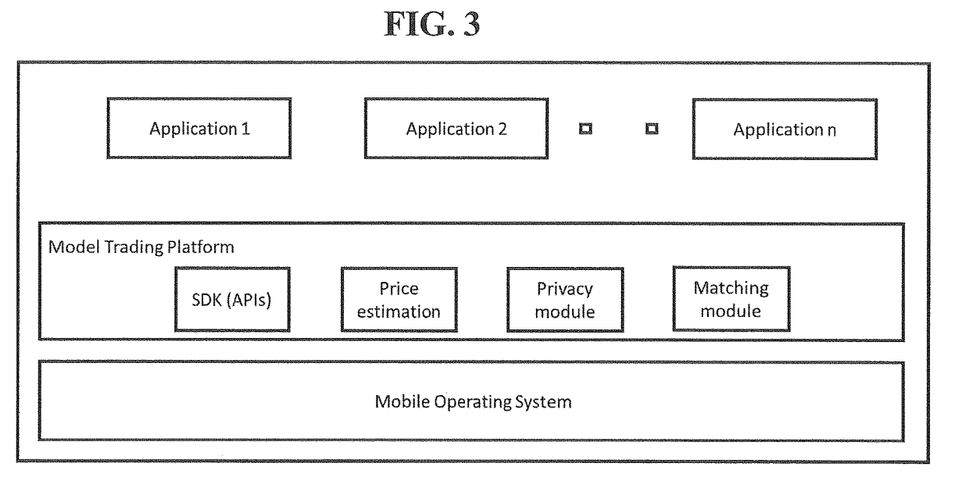
FIG. 3 exemplarily depicts a system architecture for the Software Development Kit (SDK) interfacing with the Operating System (OS) of the device.

The method 100 can be embodied as a Software Development Kit (SKD) to modify the operating system (OS) of the device. The SDK can include functions such as a matching function to match features to applications in that applications need to specify the meta-data through the template provided by the SDK. This allows features to be matched that are able to improve the accuracy of the particular application. The SDK can include a function to support interoperability by providing defined interfaces for applications to be able to exchange features via a publish-subscribe like system. Also, the SDK can include a pricing function to dynamically vary the price of the features based on the demand, supply as well as the minimum-maximum prices and budgets specified by the application owners. As depicted in FIG. 3, the SDK can be on a model trading platform that leverages the mobile operating system which communicated with Application 1, 2, . . . n.

Therefore, a second application can have features shared from a first application based on similar meta-data features (i.e., calorie count application and grocery list creation application) to provide better usability for the applications for the users.

Thus, the invention disclosed herein can provide for a system to enable model-trading across applications created by same or different organizations for quick bootstrapping of user applications and providing the user with a holistic experience. The SDK that exposes the API that applications can use to allow cross-application trading of models can include a price estimation method that takes into account explicit input(s) of a user (from surveys, feedback, etc.), implicit input (number of views, acceptances, usage, clicks, etc.), and difference in advertising revenue, users, attributed to certain features in the application. Also, the SDK can include methods to get user approvals before sharing of models to adhere to the privacy preferences. Further, the invention can include methods to allow fine-grained sharing of models, (e.g., application A may be willing to share model built-on data-set $d_1$ but not $d_2$).

The pricing can be performed per feature model "a la carte" (e.g., individually) or as a group/bundle of some or all feature-model(s) (i.e., for more than one feature-model).

Figure 2:
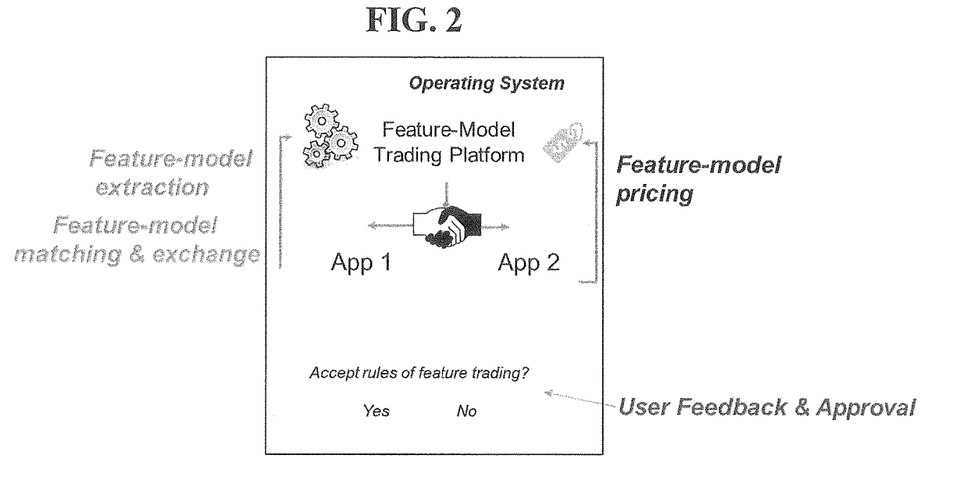
FIG. 2 exemplarily depicts a Graphical User Interface (GUI) according to an embodiment of the present invention.

With reference now to FIG. 2, an operating system can include the feature-model trading platform (i.e., the method 100) for extracting a feature-model list from a first application (App 1) and from a second application (App 2) when the second application is installed, updated, etc. Based on the feature-model list extracted and the feature-models matching between the first and second applications (i.e., potentially sharable meta-data), the feature-model pricing creates a pricing model for each of the feature-model(s) that can be shared between the applications. The user is presented with the cost and is asked to authorize the trading between the applications. Then, the meta-data is shared between the two applications if the user accepts the transaction. The user can provide feedback via the Graphical User Interface (GUI) of FIG. 2. For example, the "accept rules of trading" section of the GUI can query the user for other questions about the pricing or features to update the pricing model.

Therefore, the user's meta-data on the device can be shared between applications as facilitated by the feature-model trading platform to provide the user with a better experience for new (or updated) applications. Also, the user device can maintain privacy and security because the method 100 can be included as part of an SDK installed directly in the operating system of the device.

It is noted that the above embodiments describe a "feature-model" and a "feature-model list" being extracted and traded between applications. That is, a "feature-model" includes a model (i.e., code, an algorithm, etc.) for obtaining a feature that the application uses, whereas the feature-model list is a list of all of the feature-models (i.e., all of the algorithms, codes, Machine Learning, etc.) that the application uses. For example, a feature-model can include an algorithm to identify all geolocations between 4 PM and 6 PM. When another application uses any of the feature-models of the feature-model list (i.e., a match), a trade is facilitated. However, the invention is not limited to "feature-models".

In some embodiments, the method 100 can include a more granular approach by extracting a "feature list" and trading "features" between applications. A "feature" includes, for example, a restaurant that the user has visited and a feature-list includes all of the restaurants or a list of the category of features (i.e., geolocation can be a category in the feature list and the feature can include individual geolocations). In this manner, the applications can trade granular features between each other. Also, the matching to facilitate the trade can be done at a more granular level such that individual features can be traded between applications.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 4, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
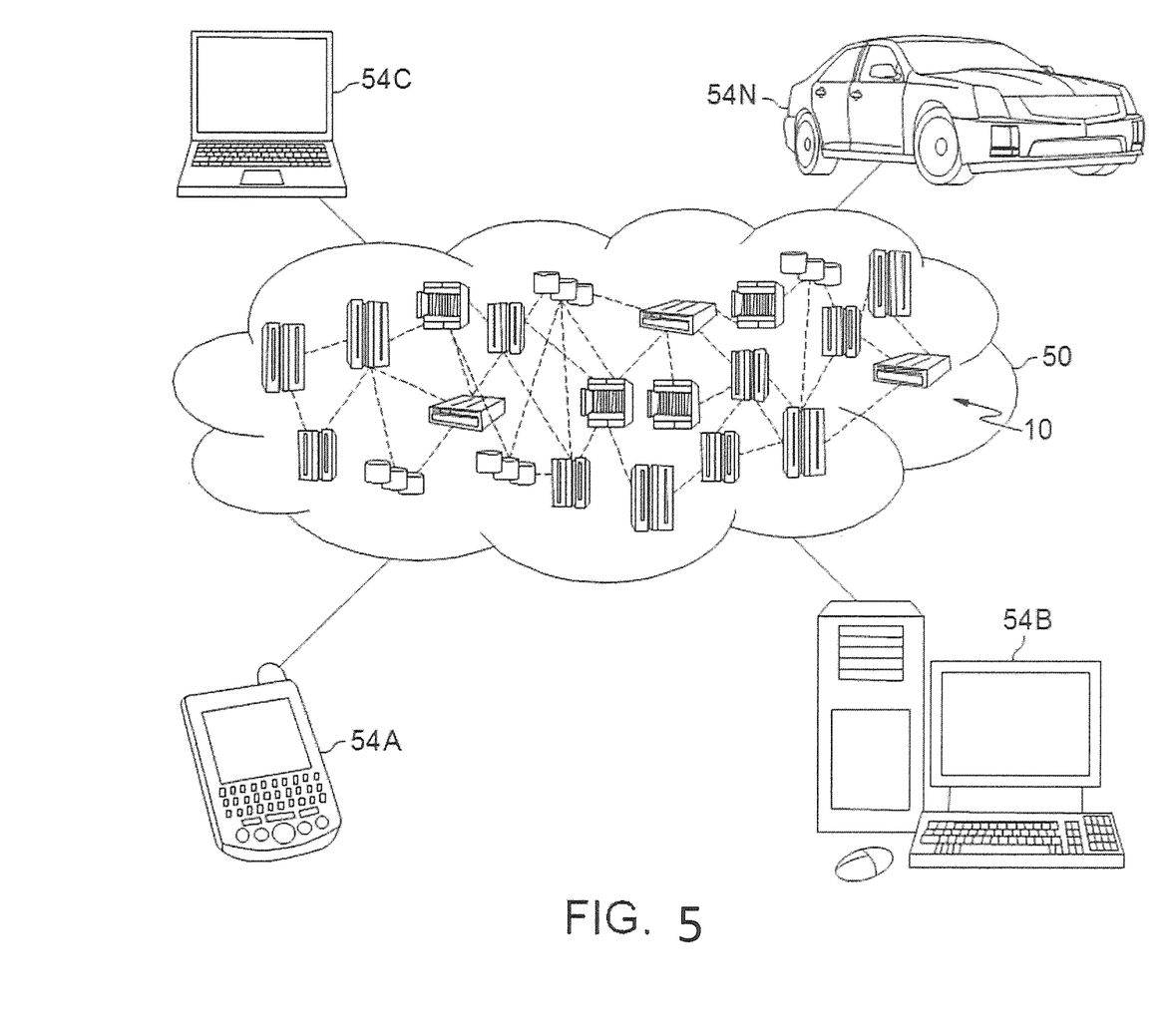
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
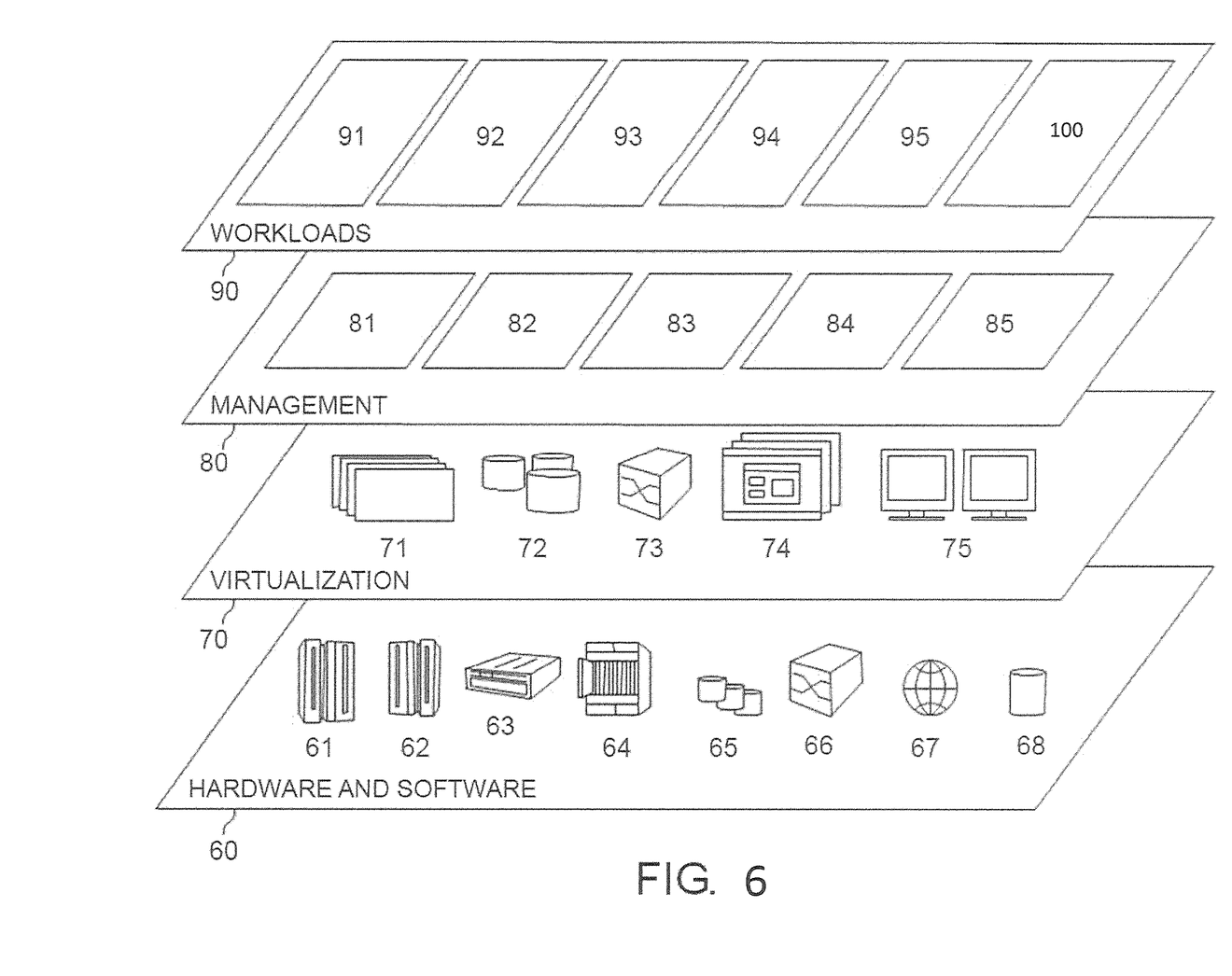
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model trading method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented model trading method, the method comprising:
    extracting a feature-model list from a first application and a feature-model list from a second application on a device based on a new install, update, and/or utilization of the second application on the device and based on a user approval, wherein, when the second application matches the feature-model list of the second application with first application, the second application stores the matching feature-model list in an internal database and matches the models in the feature-model list through keyword spotting and context-based text analytics;
    creating a price model for a price for each feature-model of the feature-model list of the second application that matches a feature-model of the feature-model list for the first application according to a result of the analysis in the internal database and that is approved for sharing by the user; and
    facilitating feature-model trading between the first application and the second application based on the feature-model list and the price model to share meta-data between the first application and the second application to provide a combined output in the second application, the combined output synergizes the meta-data together and uses the feature model from the first application in a software enabling the second application,
    wherein the extracting, the creating, and the facilitating are part of a software development kit (SDK) that leverages an operating system of the device, and
    launching a service via the operating system of the device that launches the combined output within an interface of the second application,
    wherein the service enables trading of features including the meta-data executable for a process that provides the combined output in an application between applications on the device such that the features are operable in a single location,
    wherein the single location comprises the application running the process, and
    wherein the SDK exposes an Application Programming Interface (API) for the first application and the second application to allow cross-application trading based on the feature-model list and the price model which includes a price estimation that takes into account an explicit input, an implicit input, and a difference in an advertising revenue, and
    wherein the SDK includes a function that supports interoperability by providing defined interfaces for the first application and the second application to exchange the features via a publish-subscribe system with a dynamic minimum and maximum price.

2. The computer-implemented method of claim 1, wherein feature-models of the feature-model list include at least one of:
    the meta-data for enabling the first application and the second application;
    a machine learning model;
    an inference; and
    a feature developed and trained by the first application and the second application.

3. The computer-implemented method of claim 1, wherein the feature-model of the first application matches the feature-model of the second application based on a match of underlying the meta-data for enabling a common function of the first application and the second application.

4. The computer-implemented method of claim 1, wherein the feature-model trading authorization by the user is performed entirely on the device without third-party platform intervention.

5. The computer-implemented method of claim 1, wherein the feature-model list of the first application and the feature-model list of the second application are stored in a database of the device, and
wherein the creating creates the price model for all other applications by matching the feature-models of the feature-model list with existing feature-model lists in the database for the all other applications.

6. The computer-implemented method of claim 1, wherein the creating creates the price model by performing analytics on usage statistics of the feature-model and by collecting feedback about the matched feature-models.

7. The computer-implemented method of claim 1, wherein the feature-model list includes functions of the second application and the meta-data required for the functions of the second application such that the meta-data is matched with meta-data for functions of the first application.

8. The computer-implemented method of claim 1, embodied in a cloud-computing environment.

9. A computer program product for model trading, the computer program product comprising a computer-readable storage medium having program instructions embodied therewith, the program instructions executable by a computer to cause the computer to perform:
extracting a feature-model list from a first application and a feature-model list from a second application on a device based on a new install, update, and/or utilization of the second application on the device and based on a user approval, wherein, when the second application matches the feature-model list of the second application with first application, the second application stores the matching feature-model list in an internal database and matches the models in the feature-model list through keyword spotting and context-based text analytics;
creating a price model for a price for each feature-model of the feature-model list of the second application that matches a feature-model of the feature-model list for the first application according to a result of the analysis in the internal database and that is approved for sharing by the user; and
facilitating feature-model trading between the first application and the second application based on the feature-model list and the price model to share meta-data between the first application and the second application to provide a combined output in the second application, the combined output synergizes the meta-data together and uses the feature model from the first application in a software enabling the second application,
wherein the extracting, the creating, and the facilitating are part of a software development kit (SDK) that leverages an operating system of the device, and
launching a service via the operating system of the device that launches the combined output within an interface of the second application,
wherein the service enables trading of features including the meta-data executable for a process that provides the combined output in an application between applications on the device such that the features are operable in a single location,
wherein the single location comprises the application running the process, and
wherein the SDK exposes an Application Programming Interface (API) for the first application and the second application to allow cross-application trading based on the feature-model list and the price model which includes a price estimation that takes into account an explicit input, an implicit input, and a difference in an advertising revenue, and wherein the SDK includes a function that supports interoperability by providing defined interfaces for the first application and the second application to exchange the features via a publish-subscribe system with a dynamic minimum and maximum price.

10. The computer program product of claim 9, wherein feature-models of the feature-model list include at least one of:
the meta-data for enabling the first application and the second application;
a machine learning model;
an inference; and
a feature developed and trained by the first application and the second application.

11. The computer program product of claim 9, wherein the feature-model of the first application matches the feature-model of the second application based on a match of underlying the meta-data for enabling a common function of the first application and the second application.

12. The computer program product of claim 9, wherein the feature-model trading authorization by the user is performed entirely on the device without third-party platform intervention.

13. A model trading system, said system comprising:
a processor; and
a memory, the memory storing instructions to cause the processor to perform:
extracting a feature-model list from a first application and a feature-model list from a second application on a device based on a new install, update, and/or utilization of the second application on the device and based on a user approval, wherein, when the second application matches the feature-model list of the second application with first application, the second application stores the matching feature model list in an internal database and matches the models in the feature-model list through keyword spotting and context-based text analytics;
creating a price model for a price for each feature-model of the feature-model list of the second application that matches a feature-model of the feature-model list for the first application according to a result of the analysis in the internal database and that is approved for sharing by the user; and
facilitating feature-model trading between the first application and the second application based on the feature-model list and the price model to share meta-data between the first application and the second application to provide a combined output in the second application, the combined output synergizes the meta-data together and uses the feature model from the first application, in a software enabling the second application, wherein the extracting, the creating, and the facilitating are part of a software development kit (SDK) that leverages an operating system of the device, and launching a service via the operating system of the device that launches the combined output within an interface of the second application, wherein the service enables trading of features including the meta-data executable for a process that provides the combined output in an application between applications on the device such that the features are operable in a single location, wherein the single location comprises the application running the process, and wherein the SDK exposes an Application Programming Interface (API) the first application and the second application to allow cross-application trading based on the feature-model list and the price model which includes a price estimation that takes into account an explicit input, an implicit input, and a difference in an advertising revenue, and wherein the SDK includes a function that supports interoperability by providing defined interfaces for the first application and the second application to exchange the features via a publish-subscribe system with a dynamic minimum and maximum price.

14. The system of claim 13, embodied in a cloud-computing environment.

* * * * *